INVENTORS
ROBERT E. GRIFFIN
WILLIAM ZIMMERMAN
BY
ATTORNEY

INVENTORS
ROBERT E. GRIFFIN
WILLIAM ZIMMERMAN
ATTORNEY

Aug. 27, 1968  R. E. GRIFFIN ET AL  3,398,586
GYRO MONITOR MECHANIZATION

Filed June 7, 1965  7 Sheets-Sheet 4

PLATFORM COORDINATES $TR^+ = \epsilon_{A_1} + \epsilon_{B_2}$

STEP 1

STEP 2

$TR^- = -\epsilon_{A_1} + \epsilon_{B_2}$

STEP 3

$\epsilon_{A_1} = \dfrac{TR^+ - TR^-}{2}$ $\epsilon_{B_1} = \dfrac{TR^+ + TR^-}{2}$

*INVENTORS*
**ROBERT E. GRIFFIN
WILLIAM ZIMMERMAN**
BY

ATTORNEY

Aug. 27, 1968  R. E. GRIFFIN ET AL  3,398,586
GYRO MONITOR MECHANIZATION

Filed June 7, 1965  7 Sheets-Sheet 5

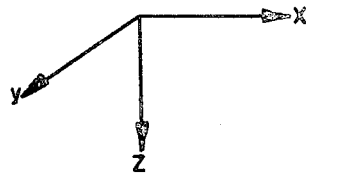

PLATFORM COORDINATES

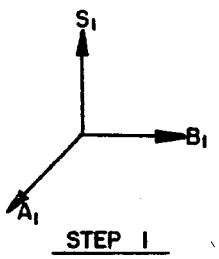

STEP 1

$$TR_{A_1}^+ = \epsilon_{A_1} + \epsilon_{B_2}$$

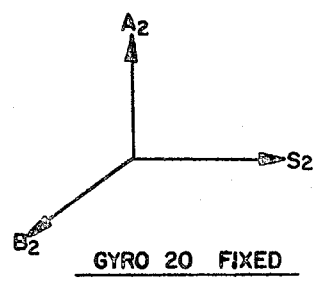

GYRO 20 FIXED

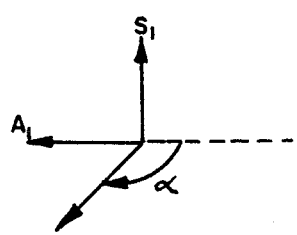

$$TR^+ = \epsilon_{B_1} + \epsilon_{B_2}$$

STEP 2

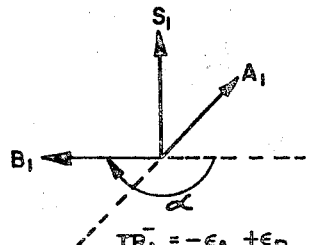

$$TR_{A_1}^- = -\epsilon_{A_1} + \epsilon_{B_2}$$

STEP 3

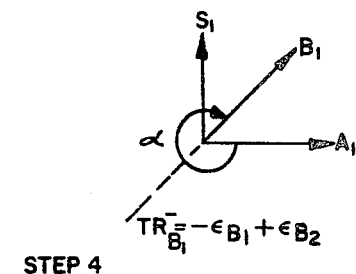

$$TR_{B_1}^- = -\epsilon_{B_1} + \epsilon_{B_2}$$

STEP 4

$$\epsilon_{B_2} = \frac{TR_{B_1}^+ + TR_{B_1}^-}{2}$$

$$\epsilon_{B_1} = \frac{TR_{B_1}^+ - TR_{B_1}^-}{2}$$

FIG. 5

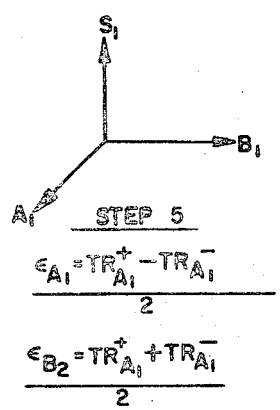

STEP 5

$$\epsilon_{A_1} = \frac{TR_{A_1}^+ - TR_{A_1}^-}{2}$$

$$\epsilon_{B_2} = \frac{TR_{A_1}^+ + TR_{A_1}^-}{2}$$

INVENTORS
ROBERT E. GRIFFIN
WILLIAM ZIMMERMAN
BY Vincent N. Cleary
ATTORNEY

Aug. 27, 1968    R. E. GRIFFIN ET AL    3,398,586
GYRO MONITOR MECHANIZATION
Filed June 7, 1965    7 Sheets-Sheet 6

GYRO 21

PLATFORM COORDINATES

GYRO 20

$T_{A_1} = \epsilon_{A_1} + \epsilon_{A_2}$

STEP 1

$T_{A_1} = -\epsilon_{A_1} + \epsilon_{A_2}$

STEP 2

STEP 3

$$\epsilon_{A_2} = \frac{T_{A_1} + T_{A_2}}{2} \qquad \epsilon_{A_1} = \frac{T_{A_1} - T_{A_2}}{2}$$

INVENTORS
ROBERT E. GRIFFIN
WILLIAM ZIMMERMAN
BY
ATTORNEY

Aug. 27, 1968    R. E. GRIFFIN ET AL    3,398,586
GYRO MONITOR MECHANIZATION
Filed June 7, 1965    7 Sheets-Sheet 7
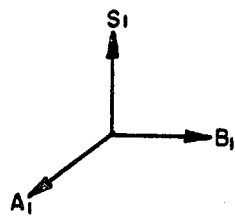
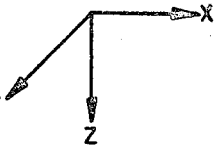
PLATFORM COORDINATES
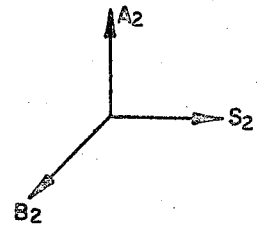
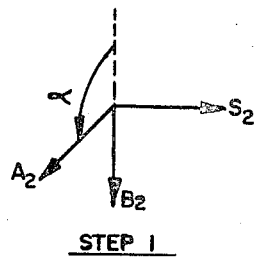
STEP 1
```
REPEAT
STEPS IN
FIG. 5
```
STEP 2
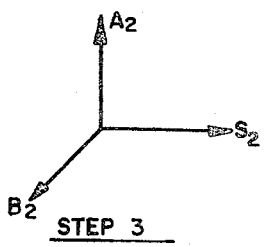
STEP 3
```
REPEAT
STEPS IN
FIG. 5
```
STEP 4
FIG. 7
INVENTORS
ROBERT E. GRIFFIN
WILLIAM ZIMMERMAN
BY
ATTORNEY United States Patent Office  3,398,586
Patented Aug. 27, 1968

3,398,586
GYRO MONITOR MECHANIZATION
Robert E. Griffin, La Habra, and William Zimmerman, Anaheim, Calif., assignors to North American Rockwell Corporation
Filed June 7, 1965, Ser. No. 463,469
11 Claims. (Cl. 74—5.34)

ABSTRACT OF THE DISCLOSURE

A method and means for monitoring the control axes of a platform stabilized by two two-axis gyroscopes in which the gyroscopes are oriented to control the platform using three of the four available sensing axes. The remaining sensing axis is aligned to the other sensing axes to monitor the operation thereof to determine the drift errors associated therewith. Both of the two-axis gyroscopes are provided with rotational mountings so that the drift rates about each of the platform controlling axes may be monitored and determined.

---

This invention pertains to a method and means for monitoring the control axes of a gyroscopically stabilized platform and more particularly to a method and means which makes use of the redundant axis of one of two two-axis gyroscopes by properly caging it with a platform controlling axis in a monitoring mode so that it can be used as an indicator of the control axis drift rate.

Present monitor systems utilize an additional single-axis gyroscope rotatably mounted on the stabilized platform. For an example of such a device see U.S. patent application Serial No. 435,409, entitled, "Gyro Monitor Adaptive Mechanization," filed Feb. 23, 1965, and now U.S. Patent No. 3,352,164 by Leonard L. Rosen and assigned to North American Rockwell Corporation, the assignee of the present application. In that patent application the input (sensing) axis of the additional gyroscope is alined parallel to the input axis of each of the platform controlling gyroscopes in alternate senses and an average value for the torque required to maintain the two input axes parallel is taken as an indication of the drift errors in the controlling gyroscope.

The means and method of this invention utilizes two two-axis gyroscopes to stabilize the platform. Each gyroscope has two sensing axes about which it can detect angular displacement. Through proper orientation of the gyroscopes it is possible to control the platform using three of the four available sensing axes. The remaining sensing axis may then be alined to one of the sensing axes used to control the platform and a monitoring operation performed to determine the drift errors associated with the controlling gyroscope. By providing one or both of the two-axis gyroscopes with rotational mountings it is also possible to monitor and determine the drift rates about each of the platform controlling axes. The method and means of this invention, therefore, does away with the heretofore required additional monitoring gyroscope.

It is, therefore, an object of this invention to provide a method and means whereby the drift errors associated with platform stabilizing gyroscopes may be determined and corrected.

It is a further object of this invention to provide a means and method utilizing two two-axis gyroscopes for determining the drift errors in a platform stabilized by said gyroscopes.

It is another object of this invention to eliminate the need for an additional monitor gyroscope in determining the drift errors in platform stabilizing gyroscopes.

It is yet another object of this invention to provide stabilization and drift error determination for a platform utilizing only two gyroscopes.

These and other objects of the present invention will become more apparent from the following description taken in connection with the accompanying drawings, in which:

FIGS. 4, 5, 6 and 7 illustrate in vector notation the positioning of the two-axis gyroscopes relative to the platform controlling axes.

Structure

Figure 1:
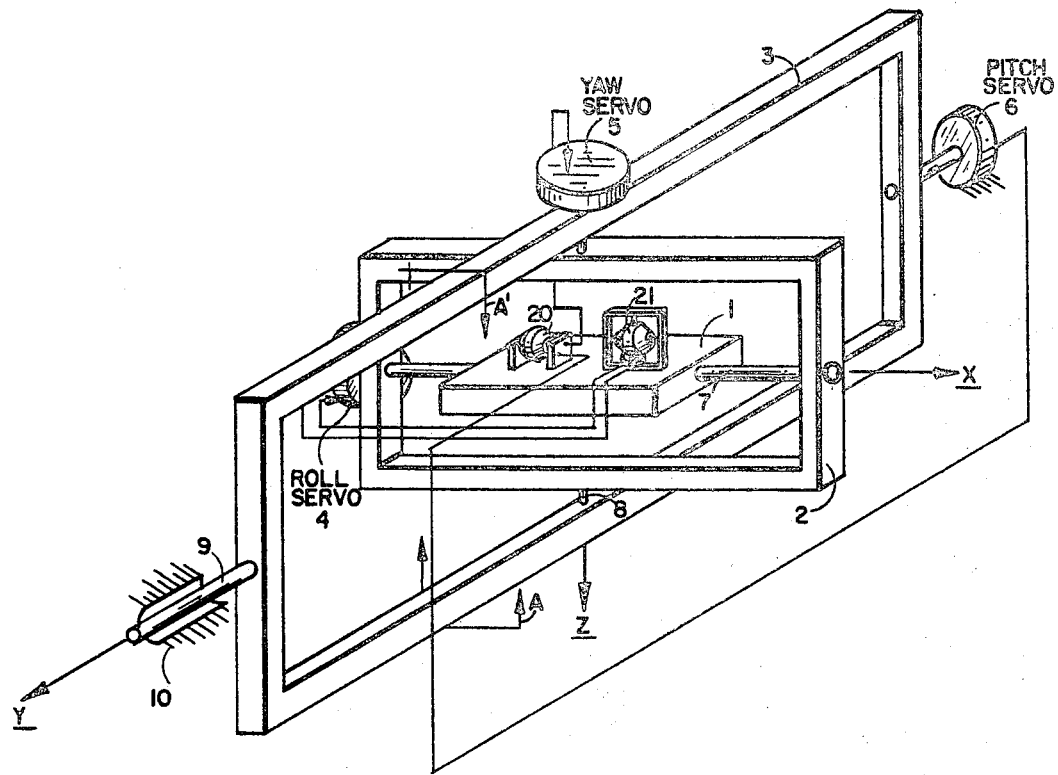
FIG. 1 is a perspective view of a platform stabilized by two two-axis gyroscopes.

Referring to FIG. 1, a platform 1 is shown stabilized by two-axis gyroscopes 20 and 21 about three platform controlling axes designated X, Y, Z. Platform 1 is supported with three-degrees of angular freedom by gimbals 2 and 3 with respect to reference 10, which may be a vehicle such as a ship, missile or aircraft. A shaft 7 defines the platform controlling axis X and rotatably connects platform 1 to gimbal 2. In aircraft applications the X-axis would be called the roll axis. A roll servo 4 in combination with gyroscope 21 stabilizes platform 1 about the X-axis. A shaft 8 defines the platform controlling axis Z and rotatably connects gimbal 2 to gimbal 3. The Z-axis is sometimes called the yaw axis. A yaw servo 5 in combination with gyroscope 20 stabilizes platform 1 about the Z-axis. A shaft 9 defines the platform controlling axis Y and rotatably connects gimbal 3 to reference 10. A Y-axis is sometimes called the pitch axis. The pitch servo 6 in combination with gyroscope 20 stabilizes platform 1 about the Y-axis.

A typical two-axis gyroscope such as that shown and described in U.S. Patent No. 3,251,233, entitled "Free Rotor Gyroscope," by D. B. Duncan, et al., and a two-axis torquing means such as that shown and described in U.S. Patent No. 3,073,170, entitled "Free Rotor Gyroscope Motor and Torquer Drives," by John M. Slater, et al., both assigned to North American Aviation, Inc., are shown in part in FIG. 2.

Figure 2:
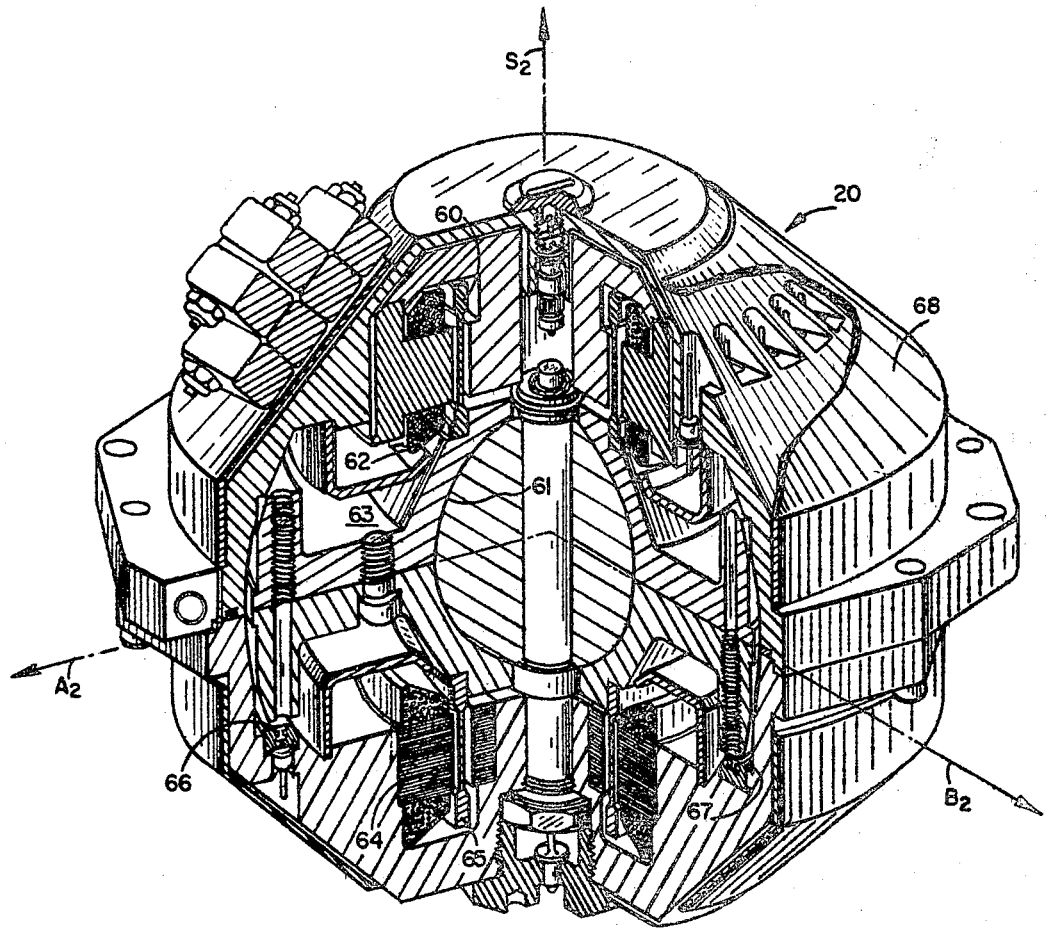
FIG. 2 is a sectional view of a two-axis gyroscope that may be utilized in the present invention.

In FIG. 2, two-axis gyroscope 20 is illustrated. Gyroscope 21 is identical in construction and operation and is, therefore, not shown. A rotor 63 is supported relative to a case 68 on a gas lubricated ball-type bearing at 61. Attached to opposite ends of rotor 63, in the embodiment of FIG. 2, by any convenient means, e.g., a shank fit, are cylindrical motor sleeve 65 and cylindrical torquer sleeve 60. A stator motor winding 64 is used to drive rotor 63. Magnetic windings, such as winding 62, may be utilized to apply torque through sleeve 60 to rotor 63 about both or either of the axes A2 or B2.

Deflection of rotor 63 relative to case 68 about axis A2 is detected by a pair of symmetrically positioned capacity pickoffs, one of which is shown at 67. The capacity pickoffs are connected to an appropriate bridge circuit (not shown) whose output signal is a measure of the deflection about axis A2 of rotor 63 relative to case 68.

The deflection of rotor 63 relative to case 68 about axis B2 is detected by a pair of symmetrically positioned capacity pickoffs, one of which is shown at 66.

The capacity pickoffs are connected to a bridge circuit (not shown) to generate an output signal which is a measure of the deflection about axis B2 of rotor 63 relative to case 63. The spin axis of rotor 68 is designated S2.

Figure 3:
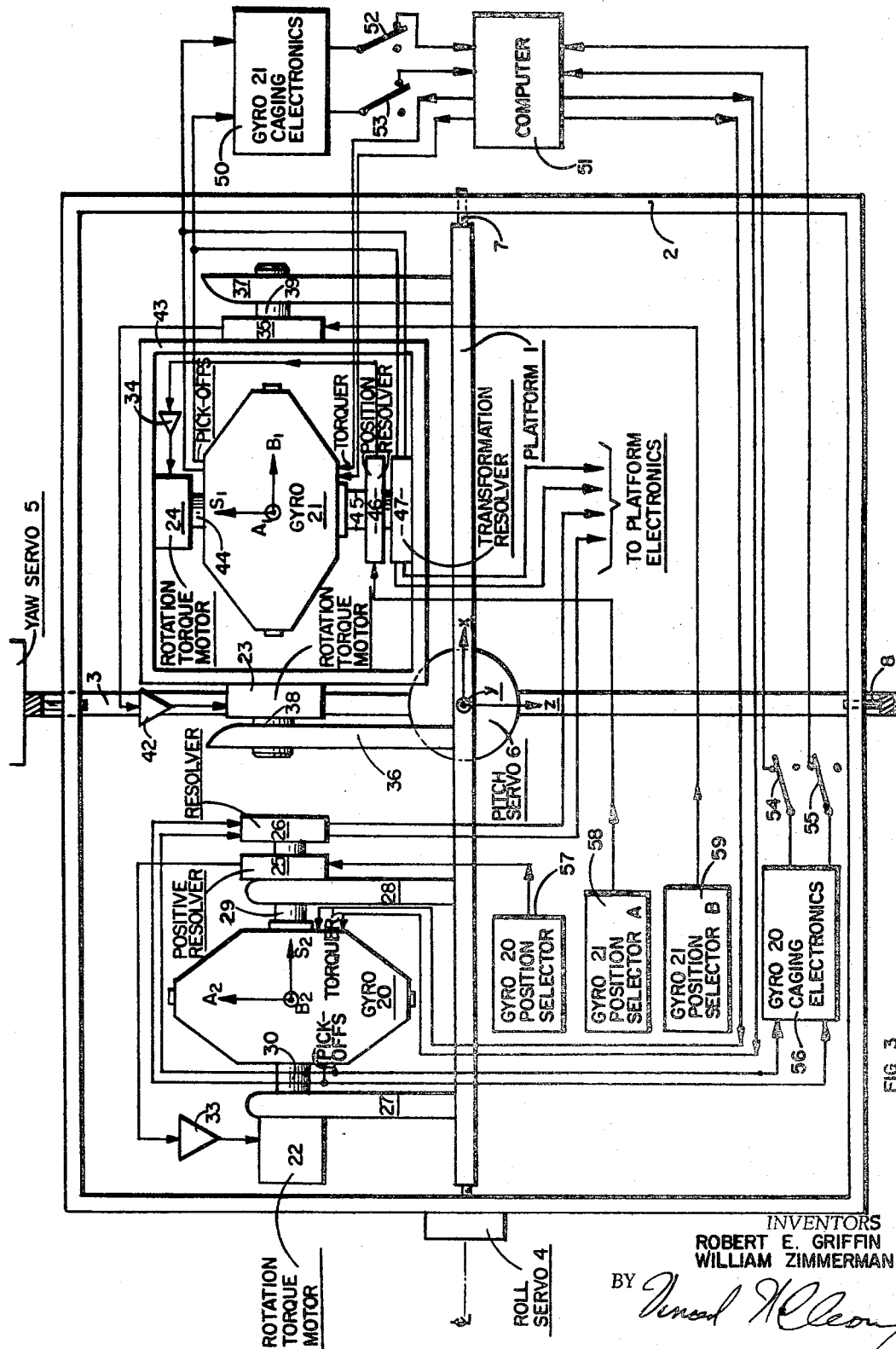
FIG. 3 is a sectional view of FIG. 1 taken at AA', illustrating the mountings of the gyroscopes, and associated electronics.

Referring now to FIG. 3, two-axis gyroscope 20 is supported for rotation about its spin axis S2 with respect to platform 1 by shafts 29 and 30 and support members 28 and 27. The two sensing axes of gyroscope 20 are designated A2 and B2 and the spin axis as S2. A gyro 20 position selector 57 is adapted to provide a position signal to a position resolver 25. The difference between the actual and desired angular position of gyroscope 20 appears as a position error signal at the input of an amplifier 33. Amplifier 33 amplifies this position error signal and provides a rotational torquer motor 22 with a drive signal which will cause torquer motor 22 to rotate gyroscope 20 to the selected position, thereby servoing the position of gyroscope 20 to the desired position indicated by the position selector 57.

A transformation resolver 26, which may be a standard sine-cosine resolver, receives the signals from capacity pickoffs 66 and 67 partially illustrated in FIG. 2 and feeds these signals to yaw and pitch servos 5 and 6. With gyroscopes 20 fixed in place as shown in FIG. 3 (not rotating about spin axis S2), the signals from pickoffs 66 and 67 are used to stabilize platform 1 about the yaw and pitch axes. When gyroscope 20 is rotated about spin axis S2, stabilization of the platform will be lost if the pickoff signals are not operated upon. Transformation resolver 26 prevents the loss of stabilization by transforming the pickoff signals as a function of the angular position of gyroscope 20.

The signals from capacity pickoffs 66 and 67 are also fed to gyro 20 caging electronics 56 and via switches 54 and 55, when in the closed position, to a computer 51. Computer 51 completes a serial path to gyroscope 20's torquer 62. When switches 54 and 55 are closed, any pickoff signal (indicating angular rotation of the 63 rotor about either or both sensing axes with respect to the case 68) is operated upon by the caging electronics so as to provide torquer 62 with a signal which will coerce rotor 63 back to a null position with respect to case 68.

With switches 54 and 55 open and with the platform operating as a navigation system, drift torque and navigational information which is transformed into proportional torques are applied to torquer 62 to keep gyroscope 20's sensing axes aligned along a set of initial reference coordinates, in this case the platform X, Y and Z axes. Switches 54 and 55 may be operated independently of each other to provide for a combination of computer correction along with the caging of one sensing axis with the case.

Computer 51 is also adapted to determine the magnitude of torque required to cage the two axes of gyroscope 20.

The caging system of gyroscope 21 which consists of similar set of capacity pickoffs and a torquer along with gyro 21 caging electronics 50, switches 52 and 53 and computer 51 to complete the serial path, operate in an identical manner as the caging system of gyroscope 20.

Two-axis gyroscope 21 having its two sensing axes designated A1 and B1 and its spin axis S1 is supported for rotation about its spin axis with respect to a gimbal 43 by shafts 44 and 45, a position torquer motor 44 and a position resolver 46.

A gyro 21 position selector 58 is adapted to provide a position signal to position resolver 46. The difference between the actual and desired angular position of gyroscope 21 appears as a position error signal at the input of an amplifier 34. Amplifier 34 amplifies this position error signal and provides a rotational torquer motor 24 with a drive signal which will cause torquer motor 24 to rotate gyroscope 21 about the S1 axis to the selected position.

A transformation resolver 47 receives the signals from the pickoffs of gyroscope 21 and feeds these signals to roll servo 4. Resolver 47 performs the same function as resolver 26, namely, providing transformation of the pickoff signal as a function of angular position so as to maintain stabilization of platform 1 about the X, Y and Z axes.

Gimbal 43 is supported for rotation with respect to platform 1 by shafts 38 and 39, support members 36 and 37, a rotational torquer motor 23 and a position resolver 35.

A gyro 21 position selector 59 in conjunction with a position resolver 35, an amplifier 42 and a rotational torquer motor 23 operate identically to the positioning systems previously described to rotate the gyroscope 21 about the X-axis (roll).

*Operation*

The method of operating the structure of this invention is divided into a non-rotating mode and a rotating mode. The rotating mode is further broken down into a one, two and three-control axis monitoring mode.

In the non-rotating monitoring scheme the redundant axis, the axis which is not used to stabilize the platform, is caged parallel to a control axis. Referring back to FIG. 3, with gyroscopes 20 and 21 fixed in the position shown, axes B2 or A1 could be used to stabilize the platform 1 about the Y-axis (pitch). With B2, for example, controlling the platform about the Y-axis, axis A1 would be caged parallel to axis B2 by gyro 21 caging electronics 50. The caging torque (torque required to keep axis A1 parallel to axis B2) is equal to the sum of the drift rates about the control axis Y and the drift of gyroscope 21 about the A1 axis. An estimate of the control axis drift rates may then be obtained by dividing in two the magnitude of the caging torque sensed by computer 51. The computer may then send a signal to the torquer of gyroscope 20 proportional to the estimate of the drift rate. This signal would have a negative sign so as to effectively cancel the drift rates acting on that controlling axis. Repeated samplings will assure better estimates of the drift error.

It is also possible to alternate the sign of the estimates so as to feed back from the computer to the torquer a negative estimate at one sampling period and a positive estimate at the next sampling period. It will be obvious to persons skilled in the art that various combinations of sampling time and sign changes may be made to effect an optimum correction, depending upon the type of navigation system used and the use to which the system is to be put.

Figure 4:
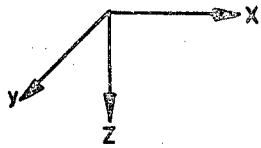
Figure 4:
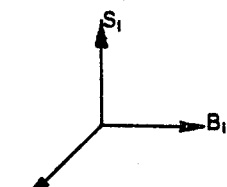
Figure 4:
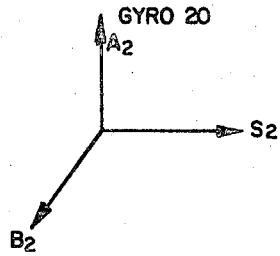
Figure 4:
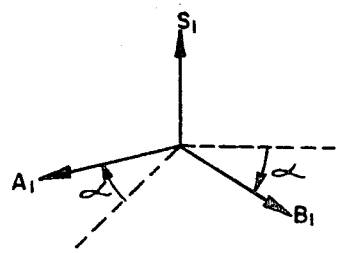
Figure 4:
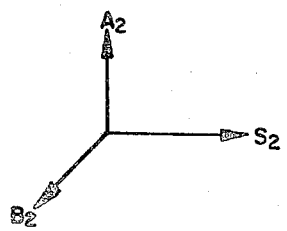
Figure 4:
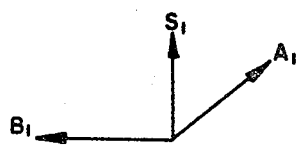
Figure 4:
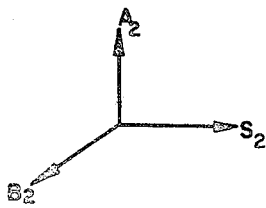

Referring now to FIG. 4, in step 1, both gyroscopes are stationary. The B1 axis controls the X platform axis; the B2, the Y platform axis; and the A2, the Z platform axis. The A1 axis is caged and the torquing rate required to keep the gyroscope caged is fed into the computer. This torquing rate is equal to the sum of the drift rates ($\epsilon$) about the A1 and B2 axes. In step 2, gyroscope 21 is rotated about its spin axis S1. During the rotation the pickoffs of the A1 and B1 axes are fed through transformation resolver 47 to the X-axis servo electronics so that platform 1 remains stable about the X-axis. In step 3, when the angle $\alpha$ equals 180 degrees, the rotation is stopped and the A1 axis is again caged. The torquing rate is then equal to the difference between the A1 and B2 axes. Since the sum and difference of the drift rates about the B1 and A2 axes are known, they may be stored in the computer. The individual drift rates can now be determined and correction torques applied to the gyroscope to reduce the drift rate. For this scheme gyroscope 20 remains fixed on the platform.

In FIG. 5, step 1, the B1 axis controls the X platform axis; the B2 axis, the Y platform axis; and the A2 axis, the Z platform axis. The A1 axis is caged and the torquing rate required to keep the gyroscope caged is fed into the computer. This torquing rate is equal to the sum of the drift rates ($\epsilon$) about the A1 and B2 axes. In step 2, gyroscope 21 is rotated about its spin axis 51 in the same manner as the Y monitoring scheme of FIG. 4. When the angle $\alpha$ reaches 90 degrees, the rotation is stopped and the B1 axis is caged so that the torquing rate is equal to the sum of the drift rates about the B1 and B2 axes. In step 3, gyroscope 21 is rotated about its spin axis 51 until $\alpha$ equals 180 degrees. The A1 axis is then caged and the torquing rate is equal to the difference between the drift rates about the B2 and A1 axes. At this point the drift rates about the B1 and A1 axis may be computed. In step 4, gyroscope 21 is rotated about its spin axis 51 until $\alpha$ equals 270 degrees. The B1 axis is then caged and the torquing rate is equal to the difference between the drift rates about the B2 and B1 axes. At this point the drift rates about the B2 and B1 axes may be computed. In step 5, gyroscope 21 is rotated about its spin axis S1 until $\alpha=0$ degrees or the gyroscope is back in its original position.

Figure 6:
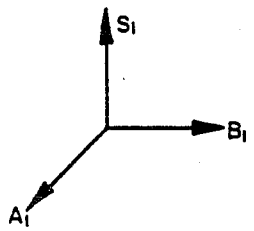
Figure 6:
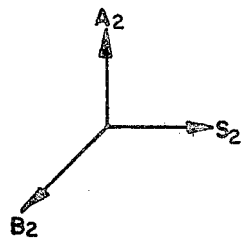
Figure 6:
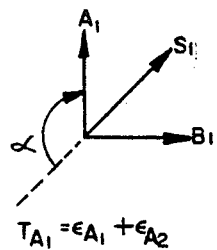
Figure 6:
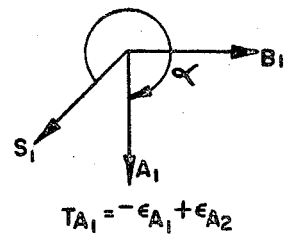
Figure 6:
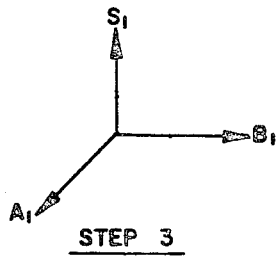

Referring to FIG. 6, step 1, the B1 gyroscope axis controls the X platform axis, the B2 gyroscope axis controls the Y platform axis, and the A2 gyroscope axis controls the Z platform axis. The A1 axis is caged and gyroscope 21 is rotated about the B1 axis until $\alpha$ equals 90 degrees or the A1 axis is in the same direction as the A2 axis. The torquing rate required to keep the A1 axis caged is then measured. In step 2, gyroscope 21 is rotated about the B1 axis until $\alpha$ equals 270 degrees or the A1 axis is in the opposite direction as the A2 axis. The torquing rate required to keep the A1 axis caged is measured. The two measured rates may then be used to compute the drift rates about the A1 and A2 axes. In step 3, gyroscope 21 is rotated about the B1 axis to its original position.

If the steps in FIG. 6 are done just after the steps in FIG. 5, then the drift rates about all the axes X, Y and Z may be determined.

In FIG. 7, step 1, rotate gyroscope 20 about the S2 axis until $\alpha$ equals 90 degrees. Axis B2 and A2 will control the Z platform axis through transformation resolver 26. In step 2, repeat the steps in FIG. 5, which will determine the drift rate of A2. In step 3, rotate gyroscope 20 about the S2 axis in the same manner as step 1 until $\alpha$ equals 0 degrees again. In step 4, repeat the steps in FIG. 5 which will determine the drift rate of B2. This last scheme allows the computation of the drift rate about all axes without any rotation about a gyroscope control axis.

In summary, the method and means of this invention utilizes two two-axis gyroscopes to stabilize a platform while providing a monitoring capability for determining and correcting the drift rates which occur about the stabilization axes of the platform.

Although the invention has been described and illustrated in detail, it is to be clearly understood that the same is by way of illustration and example only and is not to be taken by way of limitation, the spirit and scope of this invention being limited only by the terms of the appended claims.

We claim:
1. In combination with a two two-axis gyroscope stabilized platform:
   torquer means for maintaining one axis of each of said two axis gyroscopes parallel;
   means for determining the torque required to maintain said one axes parallel and for providing a correction torque to said platform as a function of said determined torque; and
   means for rotating the axes of one of said two-axis gyroscopes so as to provide for parallel alinement of one of the axes of said one gyroscope with each axis of said other two-axis gyroscope.

2. In combination with a two two-axis gyroscope stabilized platform:
   torquer means for maintaining one axis of each of said two axis gyroscopes parallel;
   means for determining the torque required to maintain said one axes parallel and for providing a correction torque to said platform as a function of said determined torque; and
   means for rotating the axes of said two-axis gyroscopes so as to provide for parallel alinement of one of the axes of one of said gyroscopes with each axis of the other two-axis gyroscope.

3. The combination as claimed in claim 1 wherein said torquer means is also adapted to maintain said one axis from each of said two-axis gyroscopes parallel in opposite senses.

4. In combination with a platform adapted to be stabilized by two two-axis gyroscopes about three mutually perpendicular controlling axes defining three degrees-of-angular freedom:
   a first two-axis gyroscope having a spin axis and two sensing axes mutually perpendicular to each other, said two sensing axes aligned parallel to two of said platform controlling axes to provide for platform stabilization about said controlling axes;
   a second two-axis gyroscope having a spin axis and two sensing axes mutually perpendicular to each other, one of said sensing axes aligned parallel to said third platform controlling axis to provide for stabilization about said third platform controlling axis;
   torquer means for maintaining the other sensing axis of said second gyroscope parallel to one of said first gyroscope's sensing axis;
   means for determining the torque required to maintain said other sensing axis parallel to said first gyroscope's sensing axis and for providing a correction torque proportional to said determined torque to said first gyroscope.

5. The combination as claimed in claim 4 and further comprising means for rotating said second gyroscope about said spin axis so as to provide for alinement of said other sensing axis parallel to said first gyroscope's one sensing axis in an opposite parallel sense.

6. The combination as recited in claim 4 and further comprising means for resolving said second gyroscope's one sensing axis so as to maintain stabilization of said platform.

7. The combination as claimed in claim 4 and further comprising means for rotating said second gyroscope about one of said sensing axes so as to provide for alinement of said other sensing axis parallel to said first gyroscope's one sensing axis in opposite parallel senses.

8. A method for determining the drift error of a two two-axis gyroscope stabilized platform comprising the steps of:
   (a) stabilize the platform utilizing three of said four gyroscope axes;
   (b) align the fourth gyroscope axis parallel to one of said three gyroscope axes in a first parallel sense;
   (c) determine the torque required to maintain said fourth gyroscope axis parallel to said one gyroscope axis;
   (d) align the fourth gyroscope axis parallel to said one gyroscope axis in an opposite parallel sense;
   (e) determine the torque required to maintain said fourth gyroscope axis parallel to said one gyroscope axis in said opposite sense;
   (f) compute the drift errors of said platform utilizing said determined torque.

9. A method as recited in claim 8 and further comprising the step of repeating the steps (a) through (e) for each of said three platform stabilizing axes.

10. A method as recited in claim 8 and further comprising the step of alternating the function of said fourth gyroscope axis among said four gyroscope axes.

11. A method as recited in claim 10 and further comprising the step of applying said computed corrections to said stabilized platform so as to correct for said drift errors.

References Cited

UNITED STATES PATENTS

| | | | |
|---|---|---|---|
| 2,949,785 | 8/1960 | Singleton et al. | 74—5.34 |
| 2,977,806 | 4/1961 | Lawe | 74—5.34 |
| 3,143,892 | 1/1964 | Chapman | 74—5.34 |
| 3,272,018 | 9/1966 | Watt | 74—5.34 |

C. J. HUSAR, *Primary Examiner.*